(12) United States Patent
Wolf et al.

(10) Patent No.: US 6,364,295 B1
(45) Date of Patent: Apr. 2, 2002

(54) BEARING FOR A POWER UNIT

(75) Inventors: Franz Josef Wolf, Bad Soden-Salmunster; Waldemar Herrmann, Lettgenbrunn; Marc Ritzenthaler, Colmar; Anton Wolf, Gelnhausen, all of (DE)

(73) Assignee: WOCO Franz-Josef Wolf & Co., Bad Soden-Salmunster (DE)

( * ) Notice: Subject to any disclaimer, the term of this patent is extended or adjusted under 35 U.S.C. 154(b) by 0 days.

(21) Appl. No.: 09/274,252

(22) Filed: Mar. 23, 1999

(30) Foreign Application Priority Data

Mar. 23, 1998 (DE) .......................................... 198 12 673

(51) Int. Cl.[7] .................................................. F16F 5/00
(52) U.S. Cl. ............................ 267/140.14; 267/140.15; 267/218
(58) Field of Search ...................... 267/140.11, 140.15, 267/140.14, 218, 219, 136; 248/632, 636, 638, 562, 563

(56) References Cited

U.S. PATENT DOCUMENTS

| | | | | |
|---|---|---|---|---|
| 3,008,703 A | * | 11/1961 | Slemmons et al. | 267/136 |
| 4,756,513 A | * | 7/1988 | Carlson et al. | 267/140.14 |
| 4,802,648 A | * | 2/1989 | Decker et al. | 267/140.15 |
| 4,886,251 A | * | 12/1989 | Haussermann | 267/219 |
| 4,901,896 A | * | 2/1990 | Smith | 267/219 |
| 5,628,499 A | * | 5/1997 | Ikeda et al. | 267/140.14 |
| 5,681,032 A | * | 10/1997 | Hofmann | 267/140.14 |

* cited by examiner

Primary Examiner—Douglas C. Butler
Assistant Examiner—Thomas J. Williams
(74) Attorney, Agent, or Firm—Lowe Hauptman Gilman & Berner, LLP

(57) ABSTRACT

A power unit bearing, in particular for motor vehicles, is characterized by mechanically integrally joining a conventional bearing, in particular a hydraulic bearing, to a connectable or disengageable hydraulic switching module for the purpose of matching the power unit characteristics to changing operational conditions of this power unit. The switching module is inserted between a chassis-side base plate of the conventional bearing body and a chassis-side adapter of the power unit bearing.

7 Claims, 4 Drawing Sheets

BEARING FOR A POWER UNIT

BACKGROUND OF THE INVENTION

The invention relates to a power unit bearing, in principle for arbitrary purposes, in specific however for motor vehicles.

Power unit bearings or so-called "engine mounts" support a motor-vehicle power unit on the chassis. Such bearings are intended to elastically absorb assembly vibrations, to dampen them and in particular to decouple them acoustically and sub-acoustically. Bearings of the most diverse designs meet these tasks in significantly different ways. Rubber-metal bearings of most varied designs with, as well as without, hydraulic damping have been found foremost practical.

As hardly any one bearing meets the broad requirements of vehicle comfort, innumerable bearings already have become known with the purpose of controlling or setting or modifying the bearing characteristics. In the field of solid bearings, that is foremost the field of rubber-metal bearings, the elastic rubber body is contoured to hopefully match a particular desired spring constant. As regards hydraulic bearings, that is bearings with a hydraulic damping liquid, foremost those bearings are known in which electrical or magnetic fields control the rheological properties of the damping liquid.

The effectiveness of all known bearings is limited in that the known means and procedures to control the bearing characteristics of power unit bearings are able to respond to only comparatively narrow and homogeneous ranges and bands of frequencies and amplitudes. Bearings are not known which for instance are able to both insulate such vibrations illustratively caused by an idling engine at low rpm and to decouple and dampen such vibrations that are generated caused by an engine running at a higher rpm in a moving vehicle, are not known.

In the light of this general state of the art, it is the objective of the present invention to create power unit bearings and in particular a motor-vehicle bearing which shall be able both to decouple and dampen low-frequency vibrations of large amplitudes such as are generated typically by an idling engine and vibrations of higher and high frequencies of small amplitudes that are generated by the drive assembly at higher rpms and vehicles moving at significant speeds.

SUMMARY OF THE INVENTION

Accordingly the basic concept of the invention is not in matching a power unit bearing known per se to its most diverse operating conditions by additionally modifying the bearing itself in complex manner and by acting in increasingly effective manner on the inherent bearing properties, but in that the actual, conventional and well-tested bearing itself is mounted on a switching module and in fact is integrated together with this switching module into one subassembly of which the specific bearing properties can be added to or decoupled from those of the conventional bearing. If the switching module is engaged, the characteristics of the conventional bearing therefore are modified by those of the switching module, whereas when the switching module is disengaged or deactivated, the conventional bearing, ie the bearing body, will be directly and at once transmitted to the chassis adapter of the power unit bearing. In its disengaged state, the switching module's transmission characteristics are in the ideal case absolutely neutral.

However in practice such a completely transmission-neutral behavior can be implemented in general only at great cost and moreover it is frequently less than mandatorily desirable in view of the acoustics. For that reason the overall structure of the power unit bearing with disengaged switching module preferably shall have a transmission behavior which can be considered being "extensively neutrally rubber-damped".

The power unit bearing with switching module of the invention can be used both with conventional solid bearings, in particular rubber metal bearings, and with complex hydraulic bearings. Preferably the switching module shall be integral with the actual, conventional bearing body to form a new, integral power unit bearing. The switching module preferably shall be related to the bearing function by means of, and together with, the bearing housing of the conventional bearing portion.

In principle such a switching module can be controlled both mechanically and electrically, electromagnetically or optionally pneumatically and in adjustable manner. Preferably and in particular when used for automotive purposes, the power unit bearing of the invention however shall be switched pneumatically and in the process will behave in its engaged or activated state in the manner of a hydraulic bearing. As a result, and even with simple designs, remarkable effective results are reached, provided that the switching module be fitted with a hydraulic operating chamber in such manner that when the operational fluid in the closed operational chamber is unpressurized, the module shall be disengaged whereas, and also in the closed system, it shall be pressurized in the engaged, activated state of the switching module. In particular hydraulic, axially effective spacing enlargements can be implemented in this manner to separate the previously axially and radially affixed switching module from the conventional bearing body.

It is clear per se that the switching module of the power unit bearing is preferably integrated on the bearing's chassis side but that kinematically reversed solutions are easily implemented as well whereby the switching module is inserted between the support piece of the bearing and the support spring of the conventional bearing body.

Moreover the switching module even in its hydraulic mode can be designed in further manner in the spring zone using other support means, for instance using an additional rubber spring or steel spring, in particular a spiral compression spring. However the determinant function of the switching module always shall be that in its disengaged state it will allow the characteristics of the conventional bearing body to be operationally as free as possible of spurious effects and that in its activated state it shall support the conventional bearing body so softly, so floatingly and so three-dimensionally that even low-frequency vibrations of high amplitudes—as are generated by a power unit running in idle—shall be decoupled as fully as possible and shall be extinguished.

The invention is elucidated below in relation to an illustrative embodiment.

DETAILED DESCRIPTION OF THE INVENTION

Figure 1:
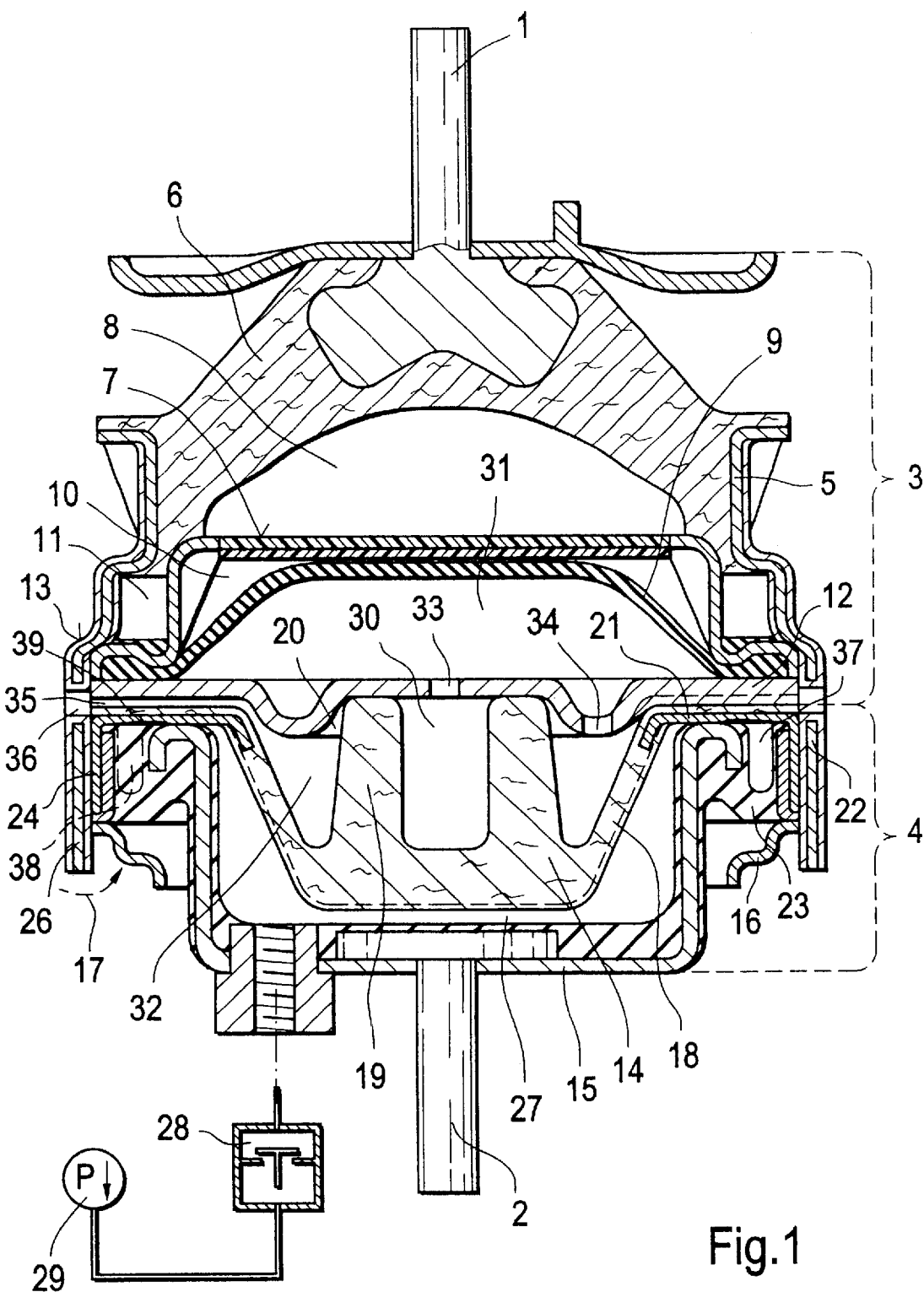
FIG. 1 is an axial section of an embodiment of the power unit bearing of the invention in its disengaged state.
Figure 2:
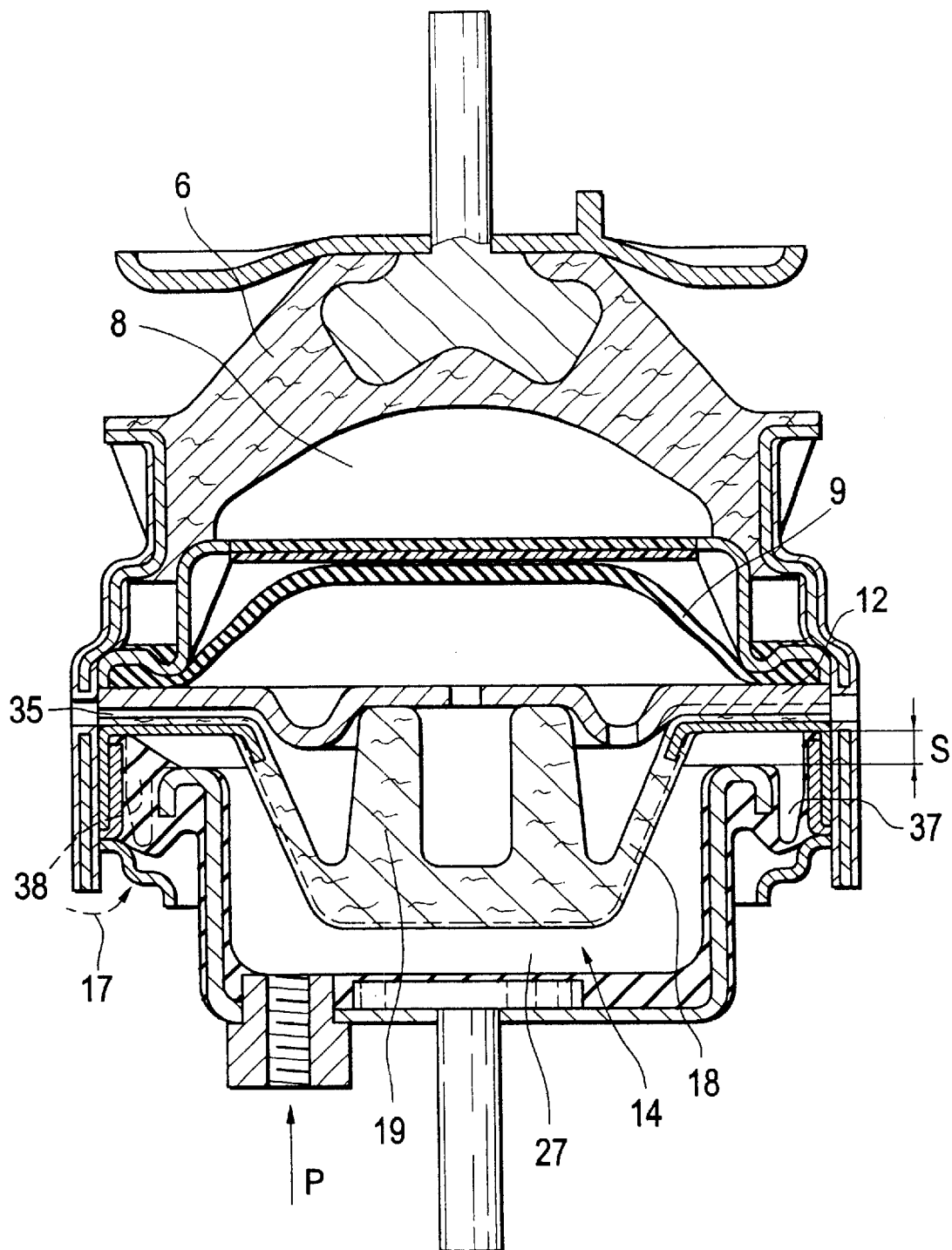
FIG. 2 shows the bearing of FIG. 2 in the same section but in its activated state.

The power unit bearing shown in axial section in FIGS. 1 and 2 is composed of a conventional hydraulic bearing 3 and a hydraulic switching module 4 inserted between a load adapter 1 and a chassis adapter 2. The hydraulic bearing 3 consists in conventional manner of a housing 5 containing a hydraulic operational chamber 8 bounded by a support spring 6 and a partition 7 and a compensating chamber 10 bounded by the partition 7 and a compensating membrane 9. The operational chamber 8 and the compensating chamber 10 hydraulically communicate with each other through a throttling duct 11. On the chassis side, the conventional hydraulic bearing 3 is sealed by a contoured base plate 12 clamping the compensating membrane 9 in fluid-tight manner against a shoulder 13 of the housing 5.

Essentially the hydraulically switched switching module 4 consists of an expansion spring inset 14, a module housing 15 and a cover ring 16.

When assembling the power unit bearing, the above parts composing the switching module are sequentially inserted into the housing 5 of the conventional bearing body 3, this housing being cylindrically open at the chassis side, as shown in FIGS. 1 and 2. In finishing this assembly, the rim segment projecting from this cylindrical bearing-housing segment is flanged in the manner indicated by the arrow 17 of FIG. 1, as a result of which both the bearing 3 and the switching module 4 are sealed in fluid-tight manner and closed as an integral sub-assembly and joined to each other.

The expansion-spring inset 14 substantially consists of a fabric-reinforced conical expansion spring 18 and a cylindrical support spring 19 integral with it and resting in a matching recess 20 in the base plate 12 of the bearing 3, and of an expansion spring flange 21 vulcanized into the expansion-spring material and merging into a cylindrical notch 22 drawn toward the chassis. A radial spring 23 enters this cylindrical ring of the expansion-spring inset 14, a cylindrical steel reinforcement 24 also being vulcanized into the peripheral zone of this spring 23.

On the support side, the radical spring 23 encloses the annularly flanged and hence reinforced rim of the module housing 15. The outside diameter of the module-housing flange is substantially smaller than the inside diameter of the cylindrical reinforcement 24. This reinforcing ring 24 is flexibly connected through the radial spring 23 with the module-housing flange 25. On the other hand the cylindrical lower notch 26 of the bearing housing 5, the cylindrical segment 22 of the expansion spring flange 21 and the cylindrical reinforcement 24 of the radial spring 23 form a frictional bond which is enhanced in form-fit locking manner by the flange of the notch 26.

The hydraulic operational chamber 27 of the switching module 4 is defined between the expansion spring 18 and the switching-module housing 15 and hereafter will be called "inner chamber" for brevity.

The inner chamber 27 is accessible, ie it can be closed hydraulically by means of a control valve 28 and it can be pressure-loaded by a hydraulic pump 29.

The inner space 30, 31, 32 between the expansion spring 18 and the compensating membrane 9 is vented in unpressurized manner through the apertures 33, 34, the duct 35 and the outer aperture 36.

Lastly outer chambers 37 are formed in the radial springs 23 and are separated from each other by fixed links 38. These outer chambers 37 are filled with the same operational fluid that fills the inner chamber 27.

Figure 3:
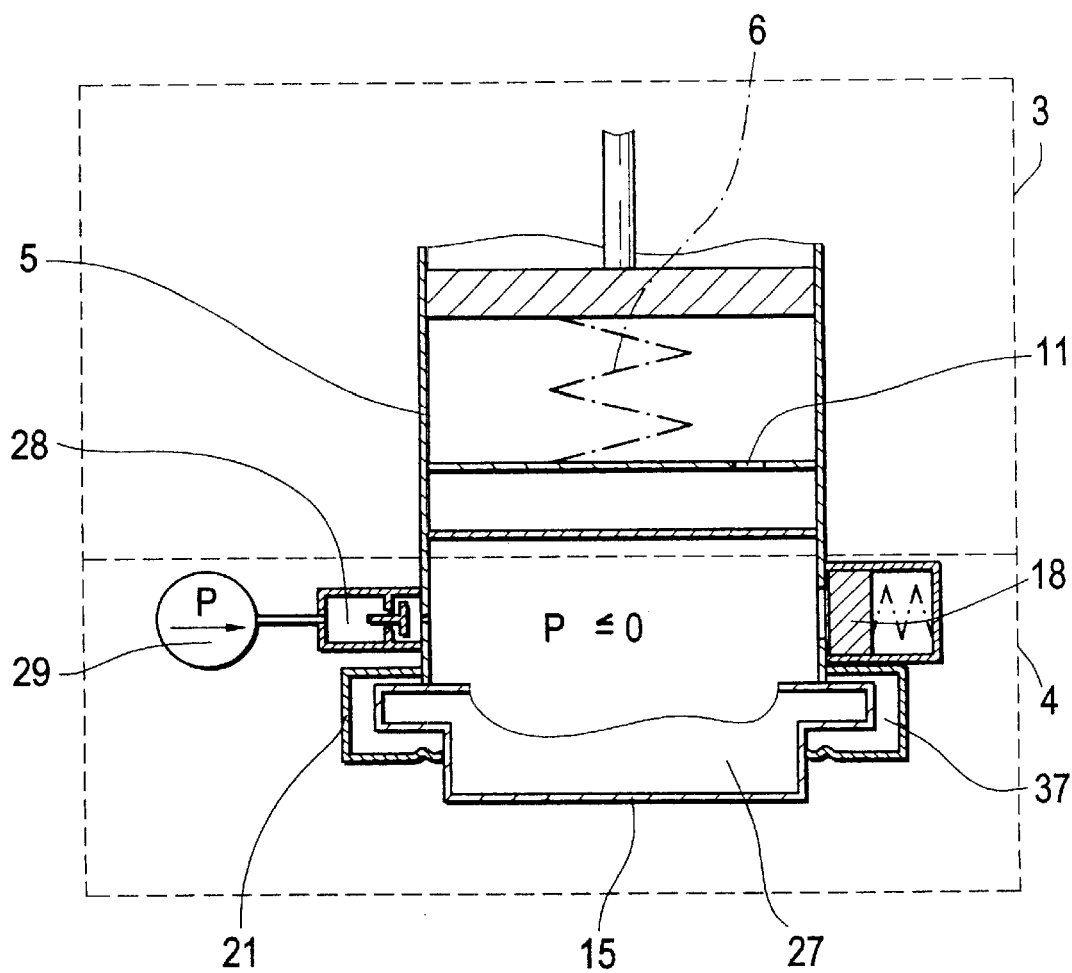
FIG. 3 is a functional diagram of the bearing of FIG. 1.

In the state shown in FIG. 1, the operational fluid in the inner chamber 27 is unpressurized, i.e. pressure P (as shown in FIG. 3) is equal or even smaller than zero. Furthermore the operational fluid in the outer chambers 37 also is unpressurized. The control valve 28 is preferably operated electrically and is closed in this instance. Under the static load of the power unit connected to the load adapter 1—in general, the load to be borne—the surface on the chassis side of the expansion spring flange 21 is pressed in sealing manner against the load-side flange area of the switching-module housing flange, whereby the inner chamber 27 is separated in fluid-tight, hermetic manner from the outer chambers 37. Sealing is improved further by a peripheral sealing bead 39. Once the power unit bearing has statically dropped, the control valve 28 is closed and the conventional bearing 3 is fixed in place both axially through the closed outer chambers 37 and radially through the closed inner chamber 27, and the expansion-rigid, fabric-reinforced expansion spring 18 is fixed in place resp. in geometric or frictional locking manner in the direction of tension or of pressure by the expansion spring flange 21 resting against the switching module housing flange. The switching module 4 is disconnected ie disengaged. Therefore the bearing characteristics of the power unit bearing are determined exclusively by the bearing characteristics of the conventional hydraulic bearing 3.

Figure 4:
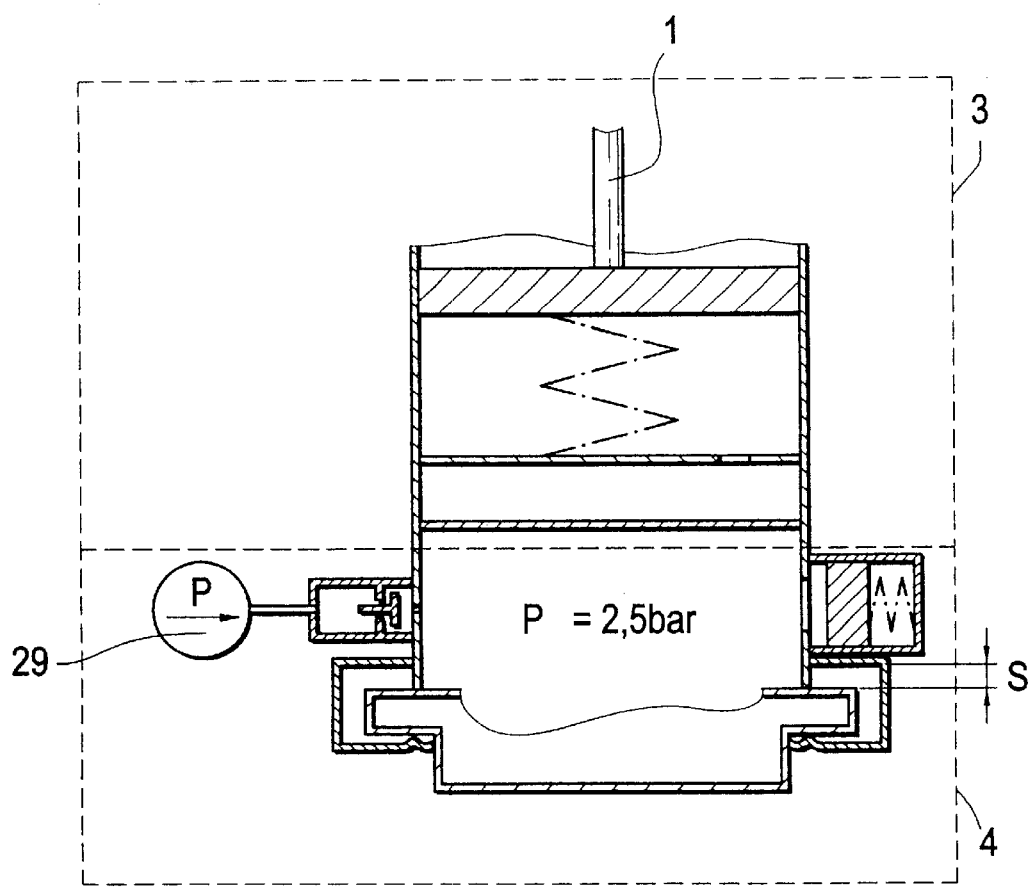
FIG. 4 is a view similar to FIG. 3 of the bearing shown in FIG. 2.

If on the other hand the control valve 28 is opened while the hydraulic pump 29 is running, pressure P of, for example, 2.5 bar (as shown in FIG. 4), will build up in the hydraulic operational chamber 27 on the expansion spring 18 and on the annular spring 19 and ultimately will raise (S) the hydraulic bearing 23 together with the power unit resting on it as shown in FIG. 2, in such manner that the outer chambers 37 communicate hydraulically under pressure compensation with the inner chamber 27. Whereas the radial spring is now freely operating in the radial direction, that is the x-direction as well as in the y-direction, this same radial spring 23 jointly with the radially inward possible expansion of the expansion spring 18 and its flexibility in the z-direction also ensures additionally axially resilient support of the hydraulic bearing 3 on the switching module 4. In other words, under these conditions, the hydraulic bearing 3 rests on or in the switching module 4 in softly elastic, gimbaled, uniform, "elastically floating" manner. As a result even large amplitudes (S) such as are introduced in idle operation especially at low rpms from supported power units into the load adapter 1 can be cushioned, decoupled and damped in the presently engaged switching module 4 (FIG. 2).

By opening the control valve 28 and by opening a return conduit not shown in detail guiding the operational fluid, the power unit bearing can be moved out of the activated state shown in FIG. 2 back into the stiffening, disengaged state shown in FIG. 1. In this process the control valve 28 closes again as soon as the expansion-spring flange 24 again rests in sealing manner against the switching-module housing flange 25 and pressure compensation is restored in the inner chamber 27 of the switching module 4.

What is claimed is:

1. A power unit bearing for motor vehicles, comprising a bearing and a switching module mechanically integrally joined to the bearing and which can be engaged to and disengaged from each other for matching bearing characteristics of the power unit bearing to changing operational conditions, wherein said switching module in an engaged state is disposed in series to said bearing to receive loads applied to the power unit bearing, thereby modifying the bearing characteristics of the power unit bearing by adding bearing properties of said switching module to bearing properties of said bearing, the power unit bearing further comprising a three-dimensional resilient coupling of said bearing to a chassis-side adapter of the power unit bearing when the switching module is in said engaged state, and a hydraulic said switching module which is disengaged from said bearing in an unpressurized manner and which is engaged to said bearing under hydraulic gauge pressure.

2. A power unit bearing for motor vehicles, comprising a bearing and a switching module mechanically integrally joined to the bearing and which can be engaged to and disengaged from each other for matching bearing characteristics of the power unit bearing to changing operational conditions, wherein said switching module in an engaged state is disposed in series to said bearing to receive loads applied to the power unit bearing, thereby modifying the bearing characteristics of the power unit bearing by adding bearing properties of said switching module to bearing properties of said bearing, the power unit bearing further comprising a three-dimensional resilient coupling of said bearing to a chassis-side adapter of the power unit bearing when the switching module is in said engaged state, and a hydraulic said switching module including an expansion-rigid operational chamber sealed in an unpressurized manner when said switching module is in a disengaged state.

3. Power unit bearing as claimed in claim 2, further comprising a hydraulic said operational chamber of the switching module, wherein when said switching module is in the engaged state said operational chamber is loaded by a hydraulic gauge pressure exceeding a load applied to the power unit bearing.

4. A power unit bearing for motor vehicles, comprising a chassis-side adapter;

a load-side adapter;

a bearing disposed between said load-side and chassis-side adapters; and a switching module mechanically integrally joined to the bearing, said switching module and bearing being engageable to and disengageable from each other for matching characteristics of the power unit bearing to changing operational conditions, wherein said switching module is inserted between said bearing and one of said chassis-side and load-side adapters, and wherein said switching module is an integratable retro-fitting part for mass-produced said bearings.

5. A power unit bearing for motor vehicles, comprising a spring bearing and a switching module mechanically joined to said spring bearing for matching bearing characteristics of the power unit bearing to varying operational conditions, wherein when said switching module is in a deactivated state, the bearing characteristics of the power unit bearing are defined exclusively by bearing characteristics of said spring bearing, when said switching module is in an activated state, the bearing characteristics of the power unit bearing are modified by bearing characteristics of said switching module in axial and radial directions; and wherein said switching module is a hydraulic switching module, and activated by a hydraulic gauge pressure exceeding a load applied to the power unit bearing.

6. A power unit bearing for motor vehicles, comprising a spring bearing and a switching module mechanically joined to said spring bearing for matching bearing characteristics of the power unit bearing to varying operational conditions, wherein when said switching module is in a deactivated state, the bearing characteristics of the power unit bearing are defined exclusively by bearing characteristics of said spring bearing, when said switching module is in an activated state, the bearing characteristics of the power unit bearing are modified by bearing characteristics of said switching module in axial and radial directions; and wherein said spring bearing is a hydraulic bearing.

7. A power unit bearing for motor vehicles, comprising a spring bearing and a switching module mechanically joined to said spring bearing for matching bearing characteristics of the power unit bearing to varying operational conditions, wherein when said switching module is in a deactivated state, the bearing characteristics of the power unit bearing are defined exclusively by bearing characteristics of said spring bearing, when said switching module is in an activated state, the bearing characteristics of the power unit bearing are modified by bearing characteristics of said switching module in axial and radial directions; and wherein said switching module is activated in response to low-frequency high-amplitude vibrating loads applied to the power unit bearing.

* * * * *